May 4, 1965 K. A. W. PERSSON 3,181,762
GUIDE DEVICE FOR TUBES DURING WELDING OPERATION
Filed Jan. 11, 1961 2 Sheets-Sheet 1
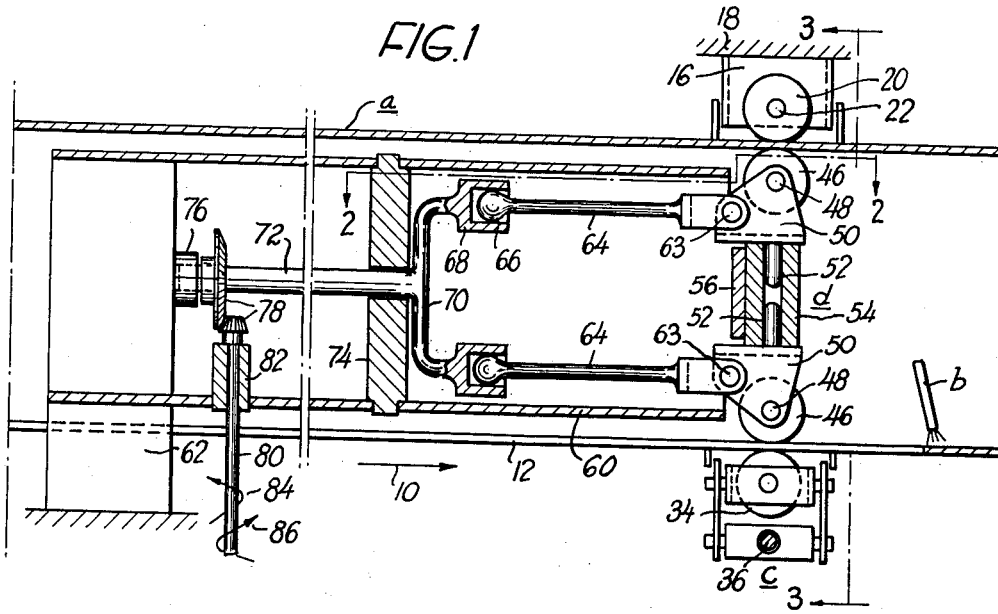
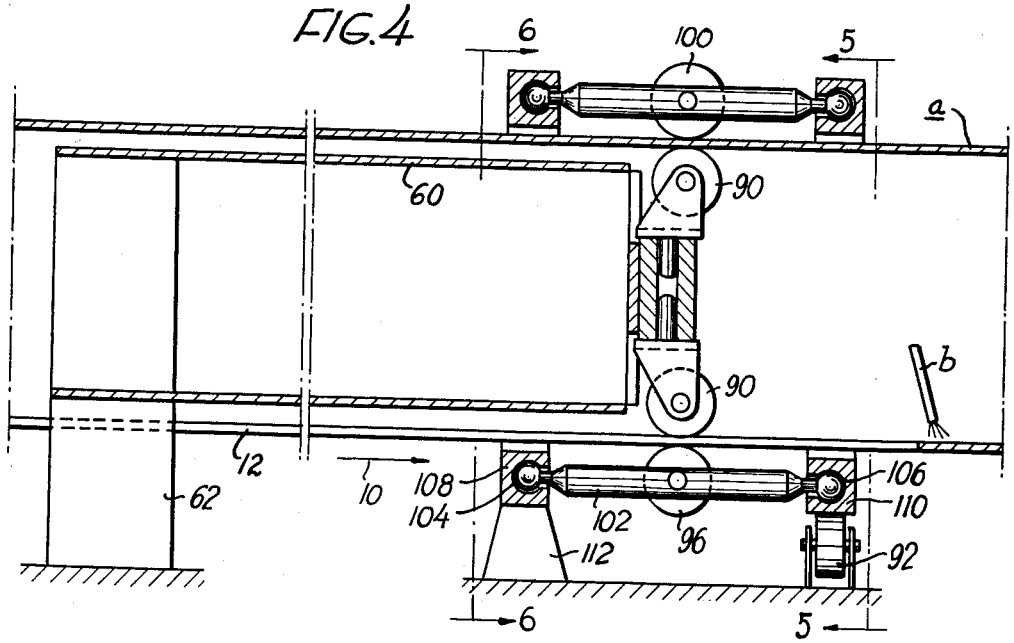
INVENTOR.
KNUT AXEL WALDEMAR PERSSON
BY
Irwin S. Thompson
ATTY.

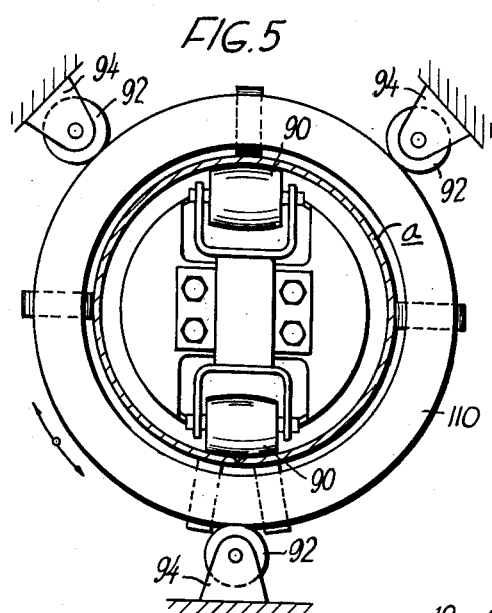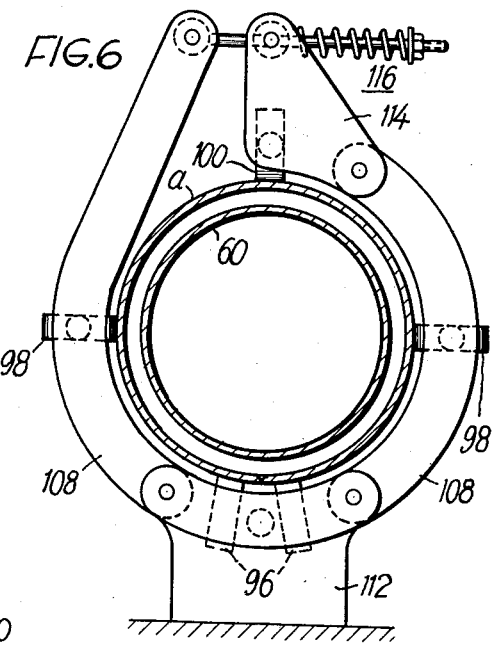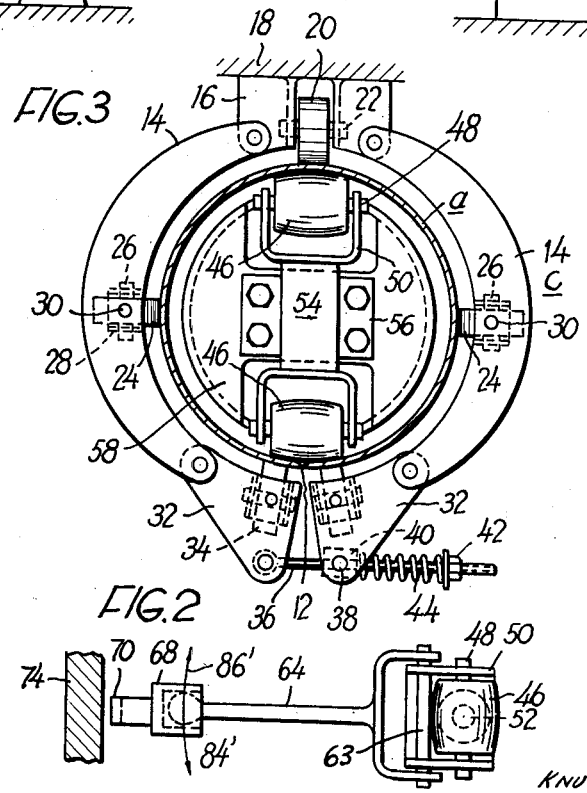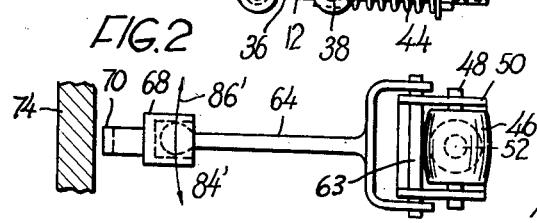

3,181,762
GUIDE DEVICE FOR TUBES DURING
WELDING OPERATION
Knut Axel Waldemar Persson, Trollbacken, Sweden,
assignor to AB Broderna Hedlund, Stockholm, Sweden,
a corporation of Sweden
Filed Jan. 11, 1961, Ser. No. 82,003
Claims priority, application Sweden, Jan. 14, 1960,
320/60
2 Claims. (Cl. 228—49)

This invention relates to the manufacturing of tubes in which a tube blank in the form of a sheet metal strip is bent to tubular form such that the longitudinal axis of the tube coincides with the longitudinal direction of the sheet metal strip and in which, after the bending operation, the longitudinal edges of the sheet metal strip are welded together.

Hitherto it has been the practice, after bending a tube blank of a certain length, to put the longitudinal edges together to form a longitudinal seam and to spot weld the edges at a few places. Thereafter, the welding operation has been carried out manually with the spot welded tube in a fixed position. An object of the present invention is to render possible a continuous welding operation according as the edges to be welded to each other are put together. In this case it is necessary to guide the tube blank and the welding member (electrode, torch) relative to each other in a manner such that the joint between the longitudinal edges of the tube blank always assumes the correct position relative to the welding member. The invention is directed to a device for guiding the tube blank and the welding member during the feeding movement so as to fulfill this condition. In a device according to the invention it is possible either to move the tube blank and to provide a fixed welding member or to move and guide the welding member along a stationary tube blank.

In its broadest aspect the invention comprises a guide roll which engages the tube blank during the longitudinal movement thereof and is adapted to rotate about an axis which extends substantially in the transverse direction of the tube blank and is adjustable through a certain angle to either side from said direction. A more effective guiding action is obtained if two guide rolls are provided for cooperation with the tube blank at diametrically opposite points thereof. If required, still more guide rolls may be provided. The guide roll or guide rolls may be in engagement with the inside or the outside of the tube blank, and the manipulating device for adjusting the guide roll has to be modified accordingly. The guide device is intended to be used together with means for embracing the tube blank so as to keep the edges to be welded to each other in correct positions relative to each other during the welding operation.

Other objects of the invention will appear from the following description of two embodiments illustrated in the accompanying drawing. FIGS. 1 to 3 illustrate an embodiment with an internally acting guiding device, FIG. 1 being a longitudinal sectional view of the tube blank and the device in a position during welding operation, FIG. 2 a section along the line 2—2 and FIG. 3 a section along the line 3—3 in FIG. 1. FIGS. 4 to 6 illustrate an embodiment with an externally acting guiding device, FIG. 4 being a longitudinal sectional view of the tube blank during the welding operation and FIGS. 5 and 6 being cross-sectional views along the lines 5—5 and 6—6, respectively, in FIG. 4.

Referring to the drawing, reference letter *a* denotes a tube blank made from a sheet metal strip which has been bent parallel to its longitudinal edges such that these edges successively meet each other. Reference letter *b* denotes a welding member, reference letter *c* denotes a clamping device which embraces the tube blank with the longitudinal edges in engagement with each other, and reference letter *d* denotes a guide device by means of which the tube blank is guided in a manner such that the joint between the longitudinal edges during the forward movement of the tube blank past the welding member will move straight in front of the welding member.

The tube blank is fed in the direction indicated by the arrow 10, and during this movement the longitudinal edges 12 which are to be welded to each other successively approach each other and are brought into contact with each other as they pass the clamping device *c*. At the left-hand end of the tube blank in FIG. 1 the longitudinal edges are spaced apart. In the clamping device *c* the edges area in contact with each other, and at the right-hand end in FIG. 1 they are welded together to form a closed tube section.

The clamping device comprises two shoes 14 disposed symmetrically with respect to the longitudinal axis of the tube. At their upper ends the shoes are pivotally mounted on lugs 16 which are secured to a frame 18 or similar member. The lugs 16 are spaced apart, and between the lugs there is provided a supporting roll 20 mounted on a shaft 22 which is carried by the lugs 16 and extends transversely of the tube. Each shoe 14 has a clamping roll 24 which is mounted for rotation on a shaft 26 extending transversely of the tube. The shaft 26 is provided in a carrier 28 which in turn is pivotally mounted in the shoe 14 such as to be able to adjust itself about a shaft 30 which is parallel to the longitudinal direction of the tube. Pivotally depending from the lower end of each shoe 14 is a clamping link 32. Each clamping link is provided with a clamping roll 34 which is mounted in the clamping link 32 in a manner similar to the clamping rolls 24 so as to be able to adjust itself about two shafts extending at right angles to each other. The clamping rolls 24 engage the tube at two diametrically opposite places, whereas the rolls 34 engage the tube near the edges 12 which are to be welded to each other. A rod 36 pivotally mounted on one of the clamping links 32 extends through a block 40 which is pivotally mounted on a cross-pin 38 in the other clamping link. The free end of the rod 36 is threaded and carries a nut 42 and a spring 44 inserted between the nut and the block 40. It will be apparent from this arrangement that while the tube blank during its forward movement travels on the rolls 20, 24 and 34, the longitudinal edges of the tube blank are yieldingly held in engagement with each other by a force which can be controlled by screwing the nut 42 inwards or outwards on the rod 36. However, it is necessary for the clamping device to permit of a certain lateral movability of the tube blank *a*, which is possible due to the pivotal suspension of the clamping shoes 14 on the lugs 16.

The guide device *d* serves to keep the longitudinal edges 12 in proper positions in front of the welding member *b* during the forward movement of the tube blank. In the embodiment illustrated in FIGS. 1 to 3, the guide device comprises two guide rolls 46 disposed diametrically one above the other and mounted on transverse shafts 48 in carriers 50 which are provided with pivot pins 52 extending radially of the tube. These pins are pivotally mounted in either end of a bearing sleeve 54 which is secured in diametrical position on a supporting plate 56, which in turn is screwed to an end plate 58 on a frame tube 60. The rolls 46 of the guide device *d* are provided near one end of the frame tube 60, which at its other end rests on a stationary supporting knife 62 which extends upwards through the gap between the longitudinal edges 12 of the tube blank.

Pivotally connected to each carrier 50 by means of a transverse pin 63 is one end of an arm 64 the other end of which is in the form of a ball 66 displaceably and pivotally mounted in a sleeve 68 which is provided on a crank 70. The crank is provided on a central shaft 72 which is mounted in a diametrical support 74 in the frame tube 60 and in a bushing 76 on the supporting knife 62. A bevel gear 78 is provided between the shaft 72 and a manipulating shaft 80 which extends through a bushing 82 projecting inwards through the wall of the tube 60.

As will be seen from FIGS. 2 and 3, the surfaces of the guide rolls 46 engaging the wall of the tube blank have a generatrix which fits the periphery of the tube when the rolls assume the central position shown in the drawing in which their axes of rotation lie in a diametrical plane through the tube blank. By means of the manipulating device 70–82, the guide rolls 46 can be adjusted to either side from said central position so that their axes of rotation make an angle with said central position or diametrical plane. For instance, if the manipulating shaft 80 is turned in the direction indicated by the arrow 84 in FIG. 1, the shaft 72 will be turned in a direction such that the upper sleeve 68 under the action of the crank 70 will be moved forward as viewed in FIG. 1 or in the direction of the arrow 84' in FIG. 2, while the lower sleeve 68 will be moved rearward as viewed in FIG. 1. The arm 64 will turn the carrier 50 in an anti-clockwise direction about the pivot 52 in the bearing sleeve 54, resulting in that the upper guide roll 46 will assume a slightly inclined position and the tube blank will be moved laterally during its forward movement. Consequently, the joint between the longitudinal edges of the tube blank will be displaced slightly laterally relative to the fixed welding member b. The lower guide roll 46 will contribute to this lateral movement, since it will assume an oppositely inclined position by means of the crank 70. If the manipulating shaft 80 is turned in the opposite direction, that is, in the direction indicated by the arrow 86 in FIG. 1, the guide rolls 46 will be inclined in opposite directions. The upper guide roll will be moved in a clockwise direction, as indicated by the arrow 86' in FIG. 2, and the tube blank will be moved laterally in a direction opposite to the direction obtained upon turning of the manipulating shaft in the direction of the arrow 84.

A device for external guiding of the tube blank instead of the internally acting guiding device described may be constructed as shown in FIGS. 4 to 6. The external guiding device can be more simple than the internal device, since the guide rolls also can act as clamping rolls. The tube blank a rests on internal supporting rolls 90 which are carried by the frame tube 60 on the supporting knife 62. A plurality of external supporting rolls 92 are provided on fixed pedestals 94. Two guide and clamping rolls 96 bear upon the tube blank near the edges 12 to be welded to each other, two rolls 98 engage the sides of the tube blank at diametrically opposite points, and a roll 100 engages the upper side of the tube blank. All of these rolls are mounted on a carrier comprising longitudinal arms 102 and turning means in the form of a ring 110. The arms 102 are provided with ball-shaped ends 104, 106 which engage corresponding seats in a pair of clamping shoes 108 and the turnable guide ring 110, respectively. The lower ends of the clamping shoes are pivotally mounted on a fixed support 112. The movable guide ring 110 is mounted for angular movement on the rolls 92. If the guide ring 110 is adjusted by being turned through a certain angle in either direction from the position illustrated in which the arms 102 are parallel to the longitudinal axis of the tube, the arms as well as the guide rolls 96, 98 and 100 will assume oblique positions and the tube will be moved laterally with respect to the welding member b. One of the clamping shoes 108 is provided with a clamping link 114 which carries the roll 100 and is acted upon by a spring device 116 similar to the device 36–44 in FIG. 3.

In the above description of the embodiments the tube blank a has been assumed to be moved longitudinally toward and past the stationary welding member b. However, the invention also comprises the modification according to which the welding member is connected with the carrier of a guide roll similar to the guide roll described above and provided either inside or outside the tube blank. In this case, the tube blank can be stationary, while the clamping device and the welding member are moved along the tube, thereby successively clamping the tube blank and welding the longitudinal edges to each other as the welding member passes along the edges. Further, it is possible to move the tube blank and provide a stationary clamping device and welding electrode and to connect the electrode with one or more guide rolls which during the movement of the tube blank adjust the electrode in correct position relative to the longitudinal edges brought into contact with each other by means of the clamping device.

What I claim is:

1. Apparatus for guiding a tube blank relative to a welding member for welding longitudinal edges of said blank to each other to form a tube, comprising first roll means positioned to bear against the exterior of the tube blank and rotatable about at least one axis disposed in a plane perpendicular to the axis of the tube blank, second roll means positioned to bear against the interior of the tube blank adjacent said first roll means and rotatable about at least one axis disposed in a plane perpendicular to the axis of the tube blank, said second roll means having convex outer peripheral surfaces, and means for bodily rotating one of said first and second roll means relative to the other of said first and second roll means about the axis of said tube blank.

2. Apparatus as claimed in claim 1, said rotating means comprising a ring on which said first roll means are mounted and which encompasses and is coaxial with the tube blank, and means mounting the ring for rotation about its axis.

References Cited by the Examiner

UNITED STATES PATENTS

| 1,999,805 | 4/35 | Dyer | 219—59 |
| 2,373,163 | 4/45 | Cailloux et al. | 113—102 |
| 2,400,889 | 5/46 | Ridder | 133—33 |
| 2,417,594 | 5/47 | Fleche | 113—131 |
| 2,580,502 | 1/52 | Anderson | 113—33 XR |
| 2,877,730 | 3/59 | Ewaldson et al. | 113—131 XR |
| 2,992,318 | 7/61 | Tour et al. | 219—59 |

CHARLES W. LANHAM, *Primary Examiner.*

WHITMORE A. WILTZ, JOHN F. CAMPBELL,
*Examiners.*